US010686883B2

(12) United States Patent
Dunsbergen et al.

(10) Patent No.: US 10,686,883 B2
(45) Date of Patent: Jun. 16, 2020

(54) BLUETOOTH LOW ENERGY DEVICES

(71) Applicant: Hewlett Packard Enterprise Development LP, Houston, TX (US)

(72) Inventors: Berend Dunsbergen, Santa Clara, CA (US); Peter Charles Mytton Thornycroft, Santa Clara, CA (US); Ankur Kamthe, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 165 days.

(21) Appl. No.: 15/643,719

(22) Filed: Jul. 7, 2017

(65) Prior Publication Data

US 2019/0014179 A1    Jan. 10, 2019

(51) Int. Cl.
*H04L 29/08* (2006.01)
*H04W 4/80* (2018.01)
*H04L 12/28* (2006.01)

(52) U.S. Cl.
CPC ........ *H04L 67/125* (2013.01); *H04L 12/2803* (2013.01); *H04L 12/2818* (2013.01); *H04L 12/2834* (2013.01); *H04L 12/2836* (2013.01); *H04L 67/025* (2013.01); *H04L 67/08* (2013.01); *H04L 67/28* (2013.01); *H04L 67/2809* (2013.01); *H04W 4/80* (2018.02); *H04L 2012/2841* (2013.01)

(58) Field of Classification Search
CPC ....... H04W 4/023; H04W 4/029; H04W 4/02; H04W 64/006; H04W 4/80; H04L 67/12; H04L 1/0002; H04L 5/0064; H04L 67/1097; H04L 67/10; G06N 20/00
See application file for complete search history.

(56) References Cited

U.S. PATENT DOCUMENTS

| 9,510,136 B2 * | 11/2016 | Dunsbergen ......... H04W 76/10 |
| 2008/0125039 A1 | 5/2008 | Glinka |
| 2012/0214418 A1 * | 8/2012 | Lee ........................ H02J 50/20 |
| | | 455/41.2 |

(Continued)

FOREIGN PATENT DOCUMENTS

| EP | 3128475 A1 | 2/2017 |
| WO | 2016/123217 A1 | 8/2016 |

OTHER PUBLICATIONS

Andersson, M.; "Use Case Possibilities with Bluetooth Low Energy in Iot Applications"; Dec. 19, 2014; 16 pages.

(Continued)

*Primary Examiner* — Ninos Donabed
(74) *Attorney, Agent, or Firm* — Hewlett Packard Enterprise Patent Department

(57) ABSTRACT

Examples described herein include receiving from a first remote access device a first file comprising an attribute profile of a first Bluetooth low energy device. In some examples, the attribute profile may include a service and a characteristic associated with the service. Examples also include storing the first file in a manner associated with the first Bluetooth low energy device, providing a service that allows for a client device to perform a number of operations on the characteristic in the attribute profile, receiving a requested operation out of the number of operations, and transmitting the requested operation to the first remote access device. The client device may be remote from the first Bluetooth low energy device.

21 Claims, 6 Drawing Sheets

(56) References Cited

U.S. PATENT DOCUMENTS

| | | | | |
|---|---|---|---|---|
| 2013/0257364 | A1* | 10/2013 | Redding | H02J 5/005 320/108 |
| 2014/0270306 | A1* | 9/2014 | Luna | H04R 3/00 381/334 |
| 2014/0286496 | A1* | 9/2014 | Luna | H04R 29/001 381/59 |
| 2014/0364089 | A1* | 12/2014 | Lienhart | H04W 4/80 455/412.2 |
| 2015/0148093 | A1* | 5/2015 | Huang | G06F 16/148 455/522 |
| 2015/0281877 | A1* | 10/2015 | Walden | H04W 4/80 455/41.2 |
| 2015/0324810 | A1* | 11/2015 | Vincent | G06Q 30/0201 705/7.29 |
| 2015/0339912 | A1 | 11/2015 | Farrand et al. | |
| 2016/0173608 | A1* | 6/2016 | Laflen | H04L 67/12 702/188 |
| 2016/0203522 | A1* | 7/2016 | Shiffert | H04W 76/14 705/14.58 |
| 2016/0232515 | A1* | 8/2016 | Jhas | G06Q 30/02 |
| 2016/0360031 | A1* | 12/2016 | Rauenbuehler | H04W 76/10 |
| 2017/0046023 | A1* | 2/2017 | Kumar | G06F 3/0482 |
| 2017/0324614 | A1* | 11/2017 | de Barros Chapiewski | H04L 41/0816 |
| 2017/0344596 | A1* | 11/2017 | Fuller | G06F 16/2358 |
| 2018/0033037 | A1* | 2/2018 | Becker | G06Q 10/06 |

OTHER PUBLICATIONS

Levy, A. et al; "Beetle: Flexible Communication for Bluetooth Low Energy"; 12 pages.

M2M Connectivity Pty. Ltd., "M2M Introduces the New IoT Gateway Feature in the Bluetooth Dual-mode Access Point Modem From ConnectBlue," Apr. 7, 2014, 9 pages.

Soultanopoulos, T. et al.; "Data Management of Sensor Signals for High Bandwidth Data Streaming to the Cloud"; 2016; 6 pages.

Zachariah, T. et al.; "The Internet of Things Has a Gateway Problem"; Feb. 12-13, 2015; 6 pages.

European Search Report and Search Opinion for EP Application No. 17198693.8, dated Feb. 12, 20118, 10 pages.

\* cited by examiner

BLUETOOTH LOW ENERGY DEVICES

BACKGROUND

Bluetooth low energy (BLE) allows for devices to communicate to each other wirelessly. In some situations, BLE connections may allow for a user of a first device to control, from the first device, the functions of a second device.

BRIEF DESCRIPTION OF THE DRAWINGS

The following detailed description references the drawings, wherein.

DETAILED DESCRIPTION

Figure 1:
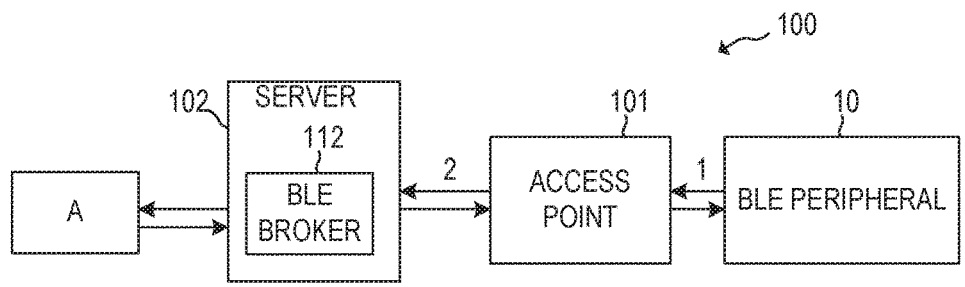
FIG. 1 is a block diagram of a BLE network extended by an intermediary network, according to some examples.

Computing devices may take on different roles when making Bluetooth low energy (BLE) connections. For example, a peripheral BLE device may accept connections from other BLE devices and it may perform functions. These functions may be called services. For example, a BLE light bulb may be characterized as a peripheral BLE device. It may have a function of providing light. Thus, it has a "light" service. As another example, a BLE door lock may also be characterized as a peripheral BLE device. It may have a function of locking a deadbolt and thus has a "lock" service.

A central BLE device may connect to a peripheral BLE device and access or control the services provided by a peripheral BLE device. Accordingly, a central BLE device that is connected to a BLE light bulb may turn the light bulb's "light" service on or off. Similarly, a central BLE device that is connected to a BLE door lock may open or close the BLE door lock's "lock" service.

The communication and commands for control between a central BLE device and a peripheral BLE device when connected via BLE may be guided by BLE protocols, defined by the BLE SIG. In some examples, a central BLE device may connect to numerous peripheral BLE devices at the same time, thus controlling multiple devices. Accordingly, a central BLE device may allow for a user of the central BLE device to control devices from the convenience of one central BLE device.

However, BLE is used in point-to-point networks. Thus, two devices (e.g., a central BLE device and a peripheral BLE device) that are connected via BLE are in BLE communication range of each other. Devices that are out of BLE communication range of each other cannot communicate to each other using BLE. Without the BLE connection, a central BLE device may not be able to control a peripheral BLE device using the BLE protocol. Thus, when a central BLE device is out of range of the peripheral BLE device, the typical control methods used by the central BLE device may not be able to be used. Accordingly, the services provided by the peripheral BLE device may not be controlled in situations where the central BLE device (or user of the central BLE device) is remote from the peripheral BLE device. For some peripheral BLE devices, situations where the central BLE device is out of BLE range are situations when control may be desired (e.g., a home owner desiring to turn off their lights when they are on vacation may not be able to do so using BLE).

Examples disclosed herein address these technological difficulties by providing systems and methods to extend the BLE network using an intermediary network. In some examples, the services offered by the BLE peripheral device is transcribed into a file that may be transmitted to an intermediary network (e.g., the Internet, etc.). The file is stored by a broker in a location that is accessible via the intermediary network. The data in the file may be used to allow a client device that is out of BLE range of the BLE peripheral device to control the BLE peripheral device. In some examples, the control may be similar as though the client device is interacting directly with the BLE peripheral device. Accordingly, examples discussed herein allow for remote access to BLE peripheral devices.

In some examples, a computing device is provided with a non-transitory machine-readable storage medium comprising instructions, that, when executed, cause a processing resource to replicate an attribute profile of a remote BLE device. The attribute profile comprises a number of services and a number of characteristics executable by the remote BLE device. The instructions, when executed, also cause the processing resource to broadcast a BLE signal, connect to a nearby Bluetooth device, receive a command for a characteristic out of the number of characteristics from the nearby Bluetooth device, and transmit the command to a Bluetooth broker.

In some examples, a computing device is provided with a non-transitory machine-readable storage medium comprising instructions, that, when executed, cause a processing resource to receive, from a first remote access device, a first file comprising an attribute profile of a first BLE device. The attribute profile comprises a service and a characteristic associated with the service. The instructions, when executed, also cause the processing resource to store the first file in a manner associated with the first BLE device, provide a service that allows for a client device associated with the first BLE device to perform a number of operations on the characteristic in the attribute profile, receive a requested operation out of the number of operations on the characteristic, and transmit the requested operation to the first remote access device.

In some examples, a method is provided, including connecting, at a first location, to a BLE device via a first protocol; discovering, at the first location, an attribute profile for the BLE device via the first protocol, and generating, at the first location, a file comprising the attribute profile. The attribute profile may comprise a service associated with a characteristic. The method also includes transmitting the file from the first location to a second location via a second protocol that is different from the first protocol; providing a service based on data in the file that allows a client computing device to perform a number of operations on the characteristic; and receiving, at the second location, a requested operation for the characteristic. Additionally, the method includes transmitting the requested operation from the second location to the first location via the second protocol, and transmitting the requested operation from the first location to the BLE device via the first protocol.

Referring now to the figures, FIG. 1 is a block diagram of a network 100 that comprises a BLE network and an intermediary network connected to the BLE. As shown in FIG. 1, the BLE network is formed by the connection of a BLE peripheral device 10 with an access point 101. A BLE peripheral device may include an electronic device that accepts BLE connections and has functions that are executable by the electronic device. Non-limiting examples of a BLE peripheral device may be a door lock, a light bulb, a smartwatch, a sensor (e.g. heartrate), a mobile phone, etc. A BLE peripheral device may model its specific executable functions in an attribute profile. The attribute profile may include a number of services and a number of characteristics associated with the number of services. As used herein, "a number" may include one, two, three, four, etc. Thus, the attribute profile of a BLE peripheral may include two services, and three characteristics associated with each of the two services. For example, a light bulb BLE peripheral may provide a "light" service. The "light" service may have a "brightness" characteristic and an "on/off" characteristic associated with the "light" service. In some examples, the attribute profile may be a generic attribute (GATT) profile. In some examples, the attribute profile may also comprise information regarding a broadcast signal of the remote BLE device (e.g., advertisement packets and/or scan response packets).

A BLE peripheral 10 may form a BLE network with access point 101 using the BLE protocol. This is represented in FIG. 1 as numeral 1. In other words, access point 101 is directly connected to BLE peripheral 10 via BLE. Accordingly, access point 101 is in a physical location from BLE peripheral 10 such that it is in the BLE communication range of BLE peripheral 10.

Access point 101 may act as a BLE central device. A BLE central device may include a computing device that is able to connect to a BLE peripheral device via BLE, discover the attribute profile of the BLE peripheral device, and communicate with the BLE peripheral device to issue commands with regard to the attribute profile. For example, in the example where BLE peripheral 10 is a lightbulb, access point 101 may issue a write command for the on/off characteristic such that BLE peripheral will turn the lightbulb on or off according to the command.

Upon discovering the attribute profile of BLE peripheral 10, access point 101 may transcribe the attribute profile into a file. For example, the file may be in the JSON or XML format. Access point 101 may also act as a bridge between the BLE network and an intermediary network. In some examples, the intermediary network may be a wireless network, a wired network, or a combination thereof. In some examples, the intermediary network may be an individual network or a collection of many such individual networks interconnected with each other and functioning as a single large network (e.g., the Internet). In some examples, the intermediary network may be implemented as a local area network (LAN), wide area network (WAN), etc. Accordingly, the intermediary network is a different type of network than the BLE network. Thus, the intermediary network uses different protocols than those used in the BLE protocol. Accordingly, the protocol which is used by access point 101 to connect to and communicate with the intermediary network is not BLE and comprises a second protocol that is different to the communication protocols used in BLE. This is represented by the numeral 2 in FIG. 1. In some examples, protocols such as the Internet Protocol (IP), Transmission Control Protocol (TCP), or TCP/IP may be used. Access point 101 may send the transcribed file comprising the attribute profile of BLE peripheral device 10 to a server 102. BLE broker 112 may be an application that runs on server 102. Through the second protocol, access point 101 sends the file to BLE broker 112. BLE broker 112 stores the file in a manner that associates the file to the BLE peripheral 10. BLE broker 112 may then accordingly provide data in the file to other devices, labeled as A in FIG. 1 such that those other devices may access the functions provided by BLE peripheral 10. Accordingly, the BLE network is extended by an intermediary network that allows access to the BLE peripheral 10. This extends the reach of the BLE peripheral such that a user that is not in BLE range of the BLE peripheral 10 may control the BLE peripheral 10.

While FIG. 1 shows access point 101 as forming a BLE network with one BLE peripheral 10, the BLE network may include additional computing devices also connected via BLE. For example, access point 101 may connect to two, three, or four BLE peripherals.

Figure 2:
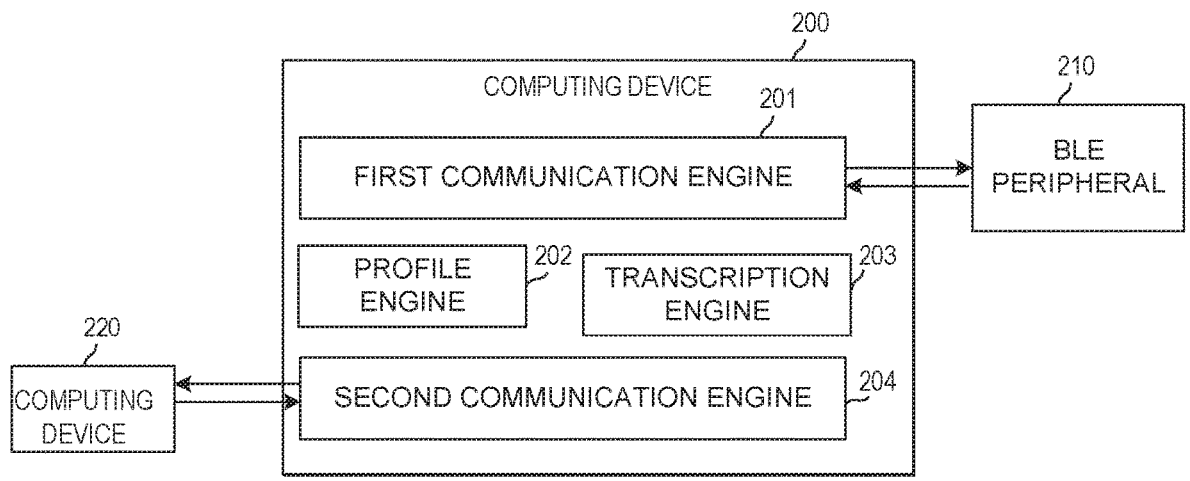
FIG. 2 is a block diagram of a computing device to connect to a BLE peripheral device, according to some examples.

FIG. 2 illustrates a block diagram of a computing device 200 to connect to a BLE peripheral device 210. As used herein, a "computing device" may be a server, a computer networking device (e.g., a switch, a gateway, an access point, etc.), a storage device, chip set, or any other processing device or equipment). In some examples, computing device 200 is an access point that may connect to BLE peripheral 210 and computing device 220.

Computing device 200 includes a first communication engine 201, a profile engine 202, a transcription engine 203, and a second communication engine 204. Each of these aspects of computing device 200 will be described below. Other engines may be added to computing device 200 for additional or alternative functionality.

Engines 201, 202, 203, and 204 may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted on hardware (e.g., software that is stored in a memory and executed or interpreted by a processor), or by hardware and software hosted on hardware. Additionally, as used herein, the singular forms "a," "an," and "the" include plural referents unless the context clearly dictates otherwise. Thus, for example, the term "engine" is intended to mean at least one engine or a combination of engines.

Each engine of computing device 200 can include at least one machine-readable storage medium (for example, more than one) and at least one processing resource (for example, more than one). As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and/or a secondary memory. The secondary memory can, for example, include a non-volatile memory where a copy of software or other data is stored.

For example, software that provides the functionality of engines on computing device 200 can be stored on a memory of a computer to be executed by a processing resource of the computer. In some examples, each engine of computing device 200 may include hardware in the form of a microprocessor on a single integrated circuit, related firmware, or other software for allowing the microprocessor to operatively communicate with other hardware of computing device 200.

A processing resource may, for example, be in the form of a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof.

First communication engine 201 is an engine of computing device 200 that includes a combination of hardware and software that allows computing device 200 to discover and connect to BLE peripheral device 210 that is within BLE communication range of computing device 200. In some examples, first communication engine 201 may allow computing device 200 to observe to see if there is a BLE peripheral device 210 within communication range. For example, the BLE peripheral device 210 may be broadcasting a BLE signal to advertise its presence. Upon determination that there is a BLE peripheral device in range, first communication engine 201 may send a connection request to BLE peripheral device 210. A connection is established between first communication engine 201 and the BLE peripheral device 210 when the BLE peripheral device accepts the request. In some examples, upon connection of computing device 200 to the BLE peripheral device 210, computing device 200 may also be characterized as a central BLE device. First communication engine 201 may also allow computing device 200 to relay a requested operation originating from a client device regarding a characteristic and transmit an associated command to BLE peripheral such that BLE peripheral executes the requested operation. For example, first communication engine may transmit a WRITE command to BLE peripheral device 210 on a characteristic of BLE peripheral device.

Profile engine 202 is an engine of computing device 200 that includes a combination of hardware and software that allows computing device 200 to discover an attribute profile of BLE peripheral 210. As discussed above, a BLE peripheral may have certain functions that are executable by the BLE peripheral. An attribute profile may describe at least one of those functions in a logical data structure. In some examples, the attribute profile may be in the form of a GATT profile. The hierarchy of a GATT profile may include a number of services to fulfill a use case of the BLE peripheral. In some examples, a service may be comprised of a number of characteristics. A service may also include references to other services. A characteristic may include a value, a set of properties indicating the operations the characteristic supports, and descriptors in the form of metadata relating to the characteristic. Thus, an attribute profile may include one service out of the number of services, one characteristic out of the number of characteristics associated with a service, a portion of the services out of the number of services, a portion of the characteristics out of the number of characteristics, or every service and every characteristic associated with every service on BLE peripheral 210. Additionally, the attribute profile may also include information regarding a broadcast signal of BLE peripheral 210 (e.g., advertisement packets and/or scan response packets).

Transcription engine 203 is an engine of computing device 200 that includes a combination of hardware and software that allows computing device 200 to take the attribute profile discovered by profile engine 202 and transcribe it into a format that may be sent to another computing device, and stored. In some examples, the format may be in a language-independent format such that it may be understood by another computing device. In some examples, the file may be in a human-readable text format such as JavaScript Object Notation (JSON) or Extensible Markup Language (XML) format.

Second communication engine 204 is an engine of computing device 200 that includes a combination of hardware and software that allows computing device 200 to connect to another computing device (e.g., a server) through an intermediary network. As discussed above, the intermediary network is different from the BLE network that is relied upon by first communication engine 201 to connect to BLE peripheral 210. Accordingly, the protocols used by second communication engine 204 are different from the protocols used by first communication engine 201. For example, first communication engine 201 may rely on the BLE protocol while second communication engine 204 may use Internet protocols, such as TCP/IP, etc. Second communication engine 204 may also allow computing device 200 to transmit the file comprising the attribute profile of BLE peripheral device 210 to computing device 220. In some examples, computing device 220 is a server that may provide a BLE broker, similar to that of server 102 described in FIG. 1 or computing device 300 described in FIG. 3. In some examples, access point 101 of FIG. 1 may have features and components as described herein in relation to computing device 200. Second communication engine 204 may also allow computing device 200 to receive a requested operation on a characteristic of BLE peripheral 210 that originates from a client device. This operation may then be relayed and sent to BLE peripheral 210 via first communication engine 201.

Figure 3:
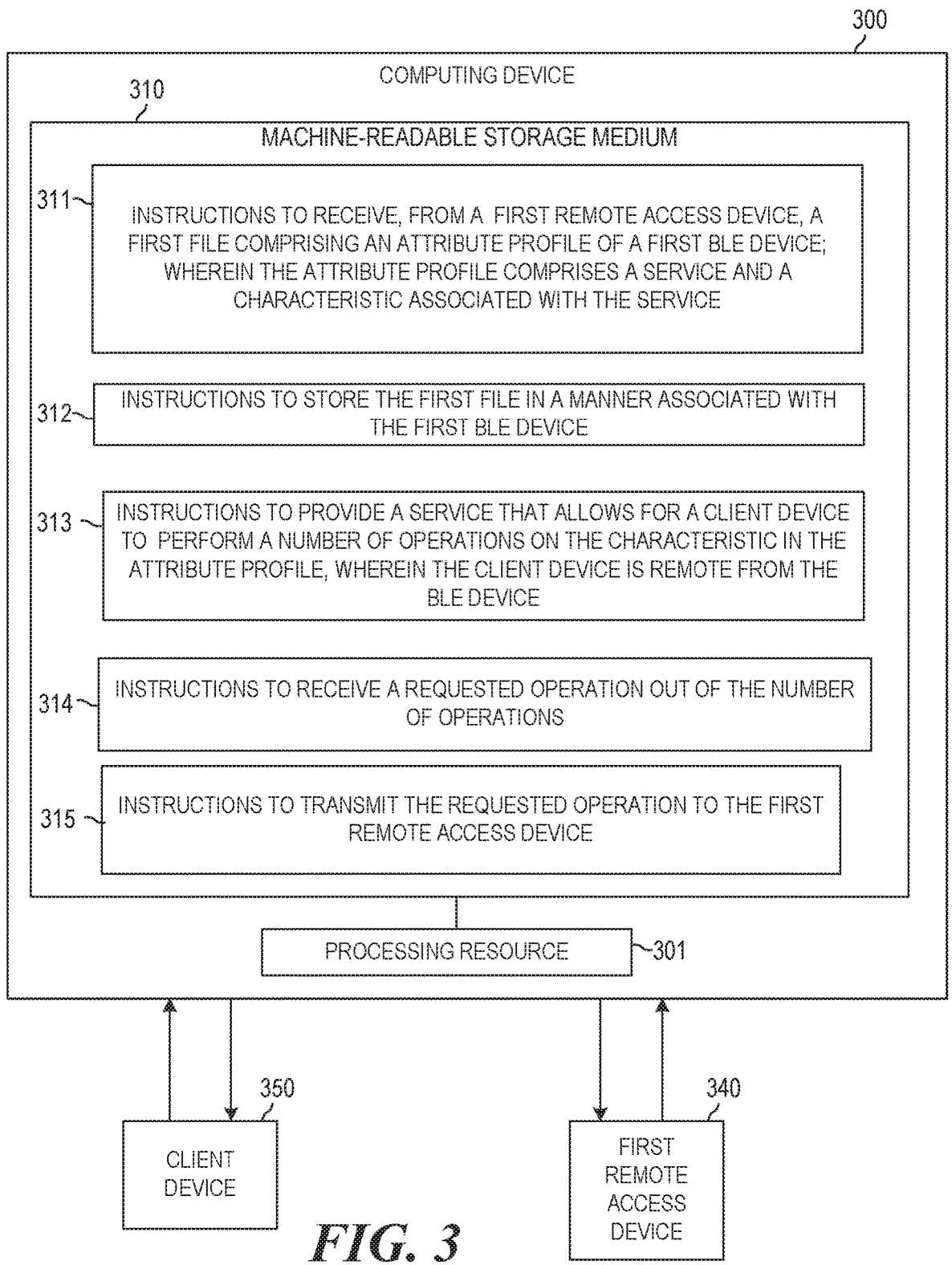
FIG. 3 is a block diagram of a computing device with instructions to provide a service allowing a client device to control a remote BLE device, according to some examples.

FIG. 3 is a block diagram of a computing device 300 with instructions thereon to provide a service that allows a client device to control a remote BLE device, according to some examples. In some examples, computing device 300 may be a server that interfaces with first remote access device 340 and client device 350. Computing device 300 includes a processing resource 301 and a machine-readable storage medium 310. Machine-readable storage medium 310 may be in the form of non-transitory machine-readable storage medium, such as suitable electronic, magnetic, optical, or other physical storage apparatus to contain or store information such as instructions 311, 312, 313, 314, 315, related data, and the like.

In the example of FIG. 3, instructions 311, 312, 313, 314, and 315 are stored (e.g., encoded) on storage medium 310 and are executable by processing resource 301 to implement functionalities described herein in relation to FIG. 3. The processing resource 301 can be functional to fetch, decode, and execute instructions 311, 312, 313, 314, and 315 as described herein. In some examples, the functionalities of any of the instructions of storage medium 310 may be implemented in the form of electronic circuitry, in the form of executable instructions encoded on machine-readable storage medium, or a combination thereof.

Instructions 311 may be executable by processing resource 301 such that computing device 300 receives a first file comprising an attribute profile of a first BLE device. Attribute profile, as discussed above, is applicable here. The first file may come from a first remote access device 340. In some examples, remote access device 340 is indirectly connected to computing device 300 via an intermediary network, such as the Internet. Accordingly, first remote access device 340 may communicate and send data to computing device 300 via TCP/IP protocols. The first BLE device may be a BLE peripheral device (e.g., similar to BLE peripheral 10 described in relation to FIG. 1) that is within BLE range of first remote access device 340. The remote access device 340 may discover the attribute profile of the BLE peripheral device and transcribe it into the first file. Instructions 311 allows computing device 300 to receive the first file from remote access device 340. As discussed above, in some examples, the first file may be in the form of JSON or XML.

Instructions 312 may be executable by processing resource 301 such that computing device 300 stores the first file received by instructions 311 in a manner that associates the first file with the first BLE device. For example, the first BLE device may have a unique identifier that identifies it to computing device 300. Instructions 312 may store the first file associated to this unique identifier such that computing device 300 understands that the first file contains data representing the attribute profile of the particular BLE device from which the attribute profile came from. The unique identifier may also be used to identify the particular BLE device to other computing devices (such as a client device that wants to control the functions of the particular BLE device). In some examples, the first file is stored in a manner that associates it with the remote access device 340 that sent the first file. For example, the remote access device 340 may also have a unique identifier that identifies it to computing device 300. This is because computing device 300 may receive a first file comprising an attribute profile of a first BLE device and it may also receive a second file comprising an attribute profile of a second BLE device. The first file may come from first remote access device 340 and the second file may come from a second remote access device (not shown in FIG. 3). Identifiers may allow computing device 300 to relay any commands that it receives with regard to a specific BLE device to the appropriate remote access device that is connected via BLE to the specific BLE device.

Instructions 313 may be executable by processing resource 301 such that computing device 300 provides a service that allows a client device to perform a number of operations on the characteristic in the attribute profile. In some examples, the client device may be associated to the first BLE device. For example, the client device may be running or accessing an application that is specific to the first BLE device. As discussed above, the first file comprises data that represents the attribute profile of the first BLE device. Thus, computing device 300 may provide a service that may increase the devices that may control the first BLE device. In other words, the service provided by computing device may allow a client device 350 that remote from the BLE device (i.e., not in the BLE range of the first BLE device) to perform a number of operations (e.g., issue a command, etc.) on the characteristic in the attribute profile. In some examples, the service may be provided using data in the first file.

In some examples, the service that is provided may be a private application program interface (API). Thus, in these examples, instructions 313 comprises instructions to provide a private API. The private API may be generated using data in the first file. As used herein, a private API is an interface that is exposed to and accessible by authorized users and computing devices meeting the access requirements set by the private API. For example, an enterprise may provide the functionalities described herein in relation to instructions 311-315. The enterprise may restrict access to its API by making it private, making so a select number of people and/or computing devices may interact with the API and use data provided by the API (e.g., internal developers, partner developers, computing devices provided by these internal and partner developers, etc.) In some examples, using data in the first file, the private API may provide operations that are operable on the characteristics in the first file (e.g., read operations, write operations, etc.). A computing device that is authorized to access the private API may access these operations. For example, the computing device may be a third remote access device (e.g., an access point, a mobile cellphone, etc.) that is different from first remote access device 340 or second remote access device discussed above. In the example shown in FIG. 3, the third remote access device may be the pathway through which client device 350 communicates to computing device 300. The third remote access device may have appropriate authorization to access and interact with the private API on computing device 300. Using the data provided by the private API, the third remote access device may replicate the attribute profile represented on the private API. The attribute profile replicated on the third remote access device is identical to the attribute profile on the first BLE device. Accordingly, client device 350 may interact with the third remote access device as though it were the first BLE device. Third remote access device may then transmit these interactions to computing device 300. In these examples, the connection between third remote access device and client device 350 is via BLE while the connection between third remote access device and computing device 300 is via the intermediary network that connects computing device 300 to first remote access device 340. This is discussed in relation to FIG. 5.

In some examples, the service that is provided may be a public application program interface (API). Thus, in these examples, instructions 313 comprises instructions to provide a public API. The public API may be generated using data in the first file. As used herein, a public API is an interface that is exposed to and accessible by wide range of users and computing devices. For example, an enterprise may provide the functionalities described herein in relation to instructions 311-315. The enterprise may make the API public, allowing users and computing devices outside of the enterprise to interact with the API and use data provided by the API. In some examples, using the data in the first file, the public API may provide operations that are operable on the characteristics in the first file (e.g., read operations, write operations, etc.). The public API may be accessed by a web application running on a computing device (e.g. a server). The web application may be specifically for the first BLE device that has the first attribute profile. In these examples, client device 350 may be another computing device (e.g., a personal computer, smartphone, etc.) that the client uses to access the web application. Through the interface provided by the web application, the client device 350 may issue operations to perform on the BLE device. The web application may then transmit these operations to computing device 300 via the public API. Computing device 300 may then transmit these operations to the first access device 340. In these examples, the connection between client device 350 and the computing device that provides the web application is via an intermediary network and not a BLE network. Additionally, the connection between the computing device that provides the web application and the computing device 300 is via an intermediary network and not a BLE network. This is discussed in relation to FIG. 8.

In some examples, the service by that is provided may be an application simulator. Thus, in these examples, instructions 313 comprises instructions to provide an application simulator. As used herein, an application simulator may create a virtual machine version of an application for a computing device (e.g. a personal computer) that accesses or runs the application simulator. In some examples, the application simulator may be a mobile application simulator. A mobile application simulator may create a virtual machine version of a mobile computing device (e.g., an iPhone, an Android, a smartphone, etc.) on a computing device that is not the mobile computing device. The mobile application simulator also will simulate a virtual machine that includes BLE connectivity ability.

For example, in some examples, client device 350 may be a personal computer. A mobile application simulator may create a virtual machine of an iPhone on the personal computer. As another example, client device 350 may be an iPhone smart phone. A mobile application simulator may also create a virtual machine of an Android on the iPhone. This may allow the computing device accessing the simulator to run applications that are designed for the environment simulated by the simulator.

Accordingly, in these examples, instructions 313 may include instructions that, when executed by processing resource 301 allow computing device 300 to load and run mobile applications on the mobile application simulator. For example, with an Android mobile simulator, an .apk file may be used and installed on the mobile application simulator. By accessing the mobile application simulator service provided by computing device 300, client device 350 may run a mobile application that is specific to the first BLE device with the first attribute profile. In other words, this allows for the client to run "off-the-shelf" mobile applications designed by the manufacturer or the first BLE device. The mobile application may then invoke commands related to a characteristic on the first attribute profile that are initiated by a requested operation on the client device 350. The requested operation may then be relayed by the service to different components of computing device 300, as is discussed below in relation to instructions 314 and 315. This is further discussed in relation to FIG. 9.

Instructions 314 may be executable by processing resource 301 such that computing device 300 receives a requested operation out of the number of operations on the characteristic. As used herein, a requested operation includes an operation that is initiated by client device 350. For example, with regard to a BLE device that is a light bulb, a client device 350 may initiate an operation that turns the lightbulb off. The characteristic may be light, and the operation may be off. Depending on the service provided by computing device 300, this requested operation may not come directly from client device 350 but may be from the third remote access device, a computing device running a web application, or from computing device 300 itself (e.g., in examples where the service provided is a mobile application simulator). In some examples, the requested operation may comprise a command for the characteristic, such as a WRITE or READ command.

Instructions 315 may be executable by processing resource 301 such that computing device 300 transmits the requested operation to the first remote access device 340. This may be accomplished via the intermediary network that connects first remote access device 340 and computing device 300 via protocols such as TCP/IP. Accordingly, computing device 300 may allow a client device 350 that is out of BLE range from first BLE device to control and interact with the first BLE device.

As discussed above, computing device 300 may interact with multiple remote access devices (such as second remote access device) that may send computing device 300 different attribute profiles for different BLE devices. Computing device 300 may store these different attribute profiles, provide services for these attribute profiles, and allow multiple client devices 350 to interact with the different BLE devices using these services. Accordingly, computing device 300 may allow additional client devices to interact with BLE devices that originally would not be able to control or interact with the BLE devices. In some examples, server 102 may include some of the functionalities described herein in relation to computing device 300.

Figure 4:
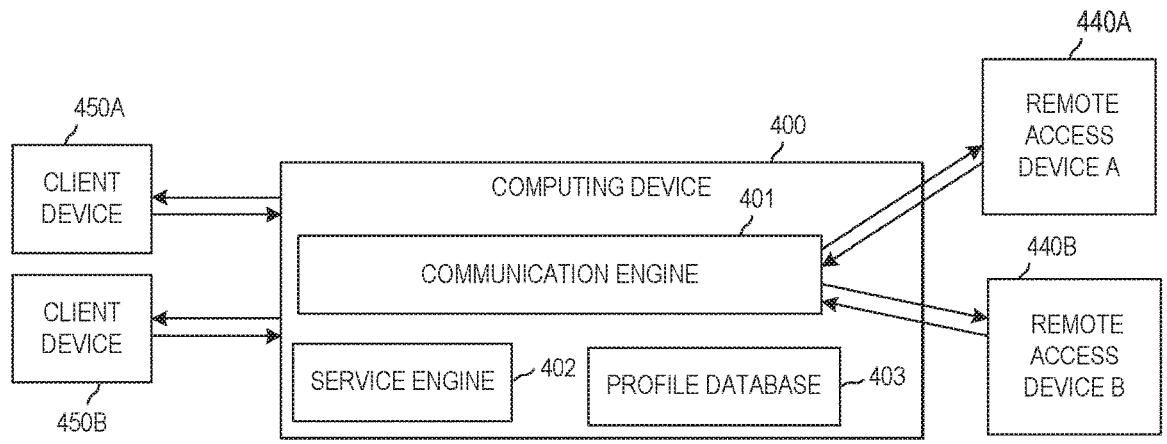
FIG. 4 is a block diagram of a computing device with a service engine to provide a BLE broker, according to some examples.

FIG. 4 illustrates a block diagram of a computing device 400 with a service engine 402. In some examples, computing device 400 may be a server that interfaces with remote access device 440A, remote access device 440B, client device 450A, and client device 450B. Computing device 400 includes a communication engine 401, a service engine 402, and a profile database 403. Other engines may be added to computing device 400 for additional or alternative functionality.

Engines 401 and 402 may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted on hardware (e.g., software that is stored in a memory and executed or interpreted by a processor), or by hardware and software hosted on hardware. Each engine of computing device 400 can include at least one machine-readable storage medium (for example, more than one) and at least one processing resource (for example, more than one).

For example, software that provides the functionality of engines on computing device 400 can be stored on a memory of a computer to be executed by a processing resource of the computer. In some examples, each engine of computing device 400 may include hardware in the form of a microprocessor on a single integrated circuit, related firmware, or other software for allowing the microprocessor to operatively communicate with other hardware of computing device 400.

Profile database 403 may be implemented by a machine-readable storage medium of computing device 400. In some examples, profile database 403 comprises a secondary memory portion as described above. Communication engine 401 and service engine 402 are in communication with profile database 403. In some examples, profile database 403 may store files for attribute profiles that are sent to computing device 400 by remote access device 440A and/or remote access device 440B. As discussed above in relation to computing device 300, the files may be stored in a manner that associates the files with the BLE devices from which the attribute profiles came from and/or in a manner that associates the files with the remote access device that sent the file. While profile database is shown in example of FIG. 4 as being housed in computing device 400, profile database 403 may be separate from computing device 400 but accessible to computing device 400.

Communication engine 401 is an engine of computing device 400 that includes a combination of hardware and software that allows computing device 400 to connect to and communicate with remote access device 440A and/or remote access device 440B. Communication engine 401 may allow computing device 400 to receive files from remote access device 440A and/or remote access device 440B. These files may comprise attribute profiles from BLE devices that are connected directly to remote access device A or remote access device B via BLE. As discussed above, the files may be in a format that is language-independent. Non-limiting examples for file formats may be JSON, XML, etc. These files may be stored in profile database 403, as discussed above. In some examples, communication engine 401 may use protocols such as TCP/IP to communicate with remote access device A and/or remote access device B. Communication engine 401 may also allow computing device 400 to transmit a requested operation for a characteristic in a specific attribute profile to the appropriate remote access device. This requested operation may be initiated by client device 450A and/or client device 450B. The appropriate remote access device may then transmit that operation into a command that may be executed on the BLE device having the attribute profile.

Service engine 402 is an engine of computing device 400 that includes a combination of hardware and software that allows computing device 400 to provide a service allowing client device 450A and/or client device 450B to perform a number of operations on the characteristic in the attribute profile. In some examples, the service may use data in the file comprising the attribute profile that is received by communication engine 401 and stored in profile database 403.

As discussed above in relation to FIG. 3, in some examples, the service may be a public API that allows a wide range of users and computing devices to access the service. In some examples, using data in a specific file stored in profile database 403, the public API may provide operations that are operable on the characteristics in the attribute profile captured in the specific file (e.g., read operations, write operations, etc.). The public API may be accessed by a web application running on a computing device (e.g. a server, not shown in FIG. 3). The web application may be specific for the BLE device that has the attribute profile captured in the file. In these examples, client device 450A and or client device 450B may be another computing device (e.g., a personal computer, smartphone, etc.) that accesses the web application. Through the interface provided by the web application, the client device 450A and/or client device 450B may issue operations to perform on the BLE device with the attribute profile captured in the file. The web application may then transmit these operations to computing device 400 via the public API. Computing device 400 may then transmit these operations to the associated remote access device 440A or remote access device 440B via communication engine 401. In these examples, the connection between client device 450A and/or client device 450B and the computing device that provides the web application is via an intermediary network and not a BLE network. Additionally, the connection between the computing device that provides the web application and computing device 400 is via an intermediary network and not a BLE network. This is discussed in relation to FIG. 5.

In other examples, as discussed above in relation to FIG. 3, the service may be a private API that allows authorized users and computing devices to access the service. In some examples, using the data in a specific file stored on profile database 403, the private API may provide operations that are operable on the characteristics in the attribute profile captured by the specific file (e.g., read operations, write operations, etc.). A computing device that is authorized to access the private API may access these operations. For example, the computing device may be a remote access device (e.g., an access point, a mobile cellphone, etc.) that is different from remote access device 440A and remote access device 440B. In the example shown in FIG. 4, the third remote access device may be the pathway through which client device 450A and/or client device 450B communicates to computing device 400. The third remote access device may have appropriate authorization to access and interact with the private API on computing device 400. Using the data provided by the private API, the third remote access device may replicate the attribute profile captured in the file. The attribute profile replicated on the third remote access device is identical to the attribute profile on the BLE device that originally provided the attribute profile. Accordingly, client device 450A and/or client device 450B may interact with the third remote access device as though it were the BLE device that originally provided the attribute profile. Third remote access device may then transmit these interactions to computing device 400 using communication engine 401. In these examples, the connection between third remote access device and client device 450A and/or 450B is via BLE while the connection between third remote access device and computing device 400 is via an intermediary network. The third remote access device may be characterized as a replicated BLE peripheral. This is discussed in relation to FIG. 5.

In other examples, as discussed above in relation to FIG. 3, the service may be an application simulator that may simulate an environment compatible with a BLE device specific application to allow a user running an incompatible computing device to access the specific application. For example, the application simulator may be a mobile application simulator for users using a client device that is a personal computer. The mobile application simulator may allow the user to access mobile applications designed for a specific mobile environment (e.g., Android). Using simulator that is provided by service engine 402, the client device 450A and client device 450B may launch a mobile application that is specific to the BLE device that provided the attribute profile.

The mobile application may then invoke commands related to a characteristic on the attribute profile. This is done by the mobile application as if the mobile application were running on a mobile device. For example, a mobile application that is designed to run on an Android with BLE capabilities will run on the mobile application simulator as if it were on an Android with BLE capabilities, rather than the computing device that is accessing the mobile application simulator. Accordingly, the mobile application may invoke commands in BLE that are initiated by the client device 450A and/or client device 450B. These commands may then be relayed to the remote access device that is connected to the BLE device via communication engine 401. Computing device 400 of FIG. 4, which is described in terms of engines containing hardware and software may include one or more structural or functional aspects of computing device 300 of FIG. 3, which is described in terms of processors and machine readable storage mediums.

Figure 5:
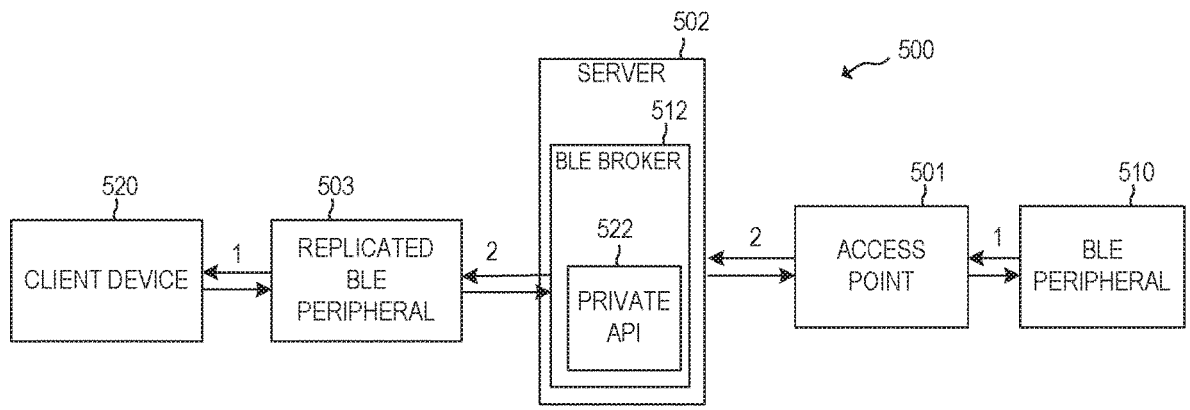
FIG. 5 is a block diagram of a BLE network using a replicated BLE peripheral and an intermediary network to extend the BLE network, according to some examples.

FIG. 5 is a block diagram of a network 500 that comprises two BLE networks and an intermediary network connecting the two BLE networks. FIG. 5 comprises a BLE peripheral device 510, an access point 501, a server 502, a replicated BLE peripheral device 503, and a client device 520. BLE peripheral 510 is similar to BLE peripheral 10, as discussed in relation to FIG. 1. The first BLE network is between access point 501 and BLE peripheral 510, as represented by numeral 1. Access point 501, server 502, and replicated BLE peripheral device 503 are connected by an intermediary network. This is represented by numeral 2 in FIG. 4. The second BLE network is between client device 520 and replicated BLE peripheral 503. This second BLE network is represented by numeral 1. The use of the same numerals may represent that the networks are of the same type, and may not represent that they are the same exact network. Access point 501 is similar to access point 101 as discussed in relation to FIG. 1. Accordingly, in some examples, access point 501 may implement the components as described with respect to computing device 200 of FIG. 2.

Server 502 is similar to server 102 and BLE broker 512 is similar to BLE broker 122, as described in relation to FIG. 1, except that the service provided by server 502 comprises a private API 522. As discussed above in relation to FIG. 3, a private API may provide an interface that is exposed to and accessible by authorized users and computing devices meeting the access requirements set by the private API. Using data in the file comprising the attribute profile that is received by server 502 from access point 501, private API 522 may provide operations operable on at least one characteristic in the attribute profile of BLE peripheral device 510. Accordingly, server 502 may implement the functionalities described in relation to computing device 300 and/or computing device 400 in which the service comprises a private API.

Replicated BLE peripheral device 503 is a computing device. In some examples, replicated BLE peripheral device 503 is a mobile computing device (e.g., a smartphone, tablet, etc.) In some examples, replicated BLE peripheral device 503 is a networking device (e.g., an access point, etc.). Replicated BLE peripheral device 503 is authorized to access private API 522 provided by server 502. As discussed above, private API 522 may use data in a file capturing a specific attribute profile to provide a number of operations on a characteristic on the specific attribute profile. Private API 522 may also present the data in the file to replicated BLE peripheral device 503. Using the data presented by private API 522, replicated BLE peripheral 503 may generate an attribute profile that is a replication of the attribute profile on BLE peripheral 510. In some examples, the BLE peripheral 510 is a remote BLE peripheral in relation to replicated BLE peripheral 503. In other words, the BLE peripheral 510 is not within BLE range of replicated BLE peripheral 503. In some examples, the BLE peripheral 510 is a remote BLE peripheral in relation to client device 520. In other words, the BLE peripheral 510 is not within BLE range of client device 520.

Replicated BLE peripheral 503 may broadcast a BLE signal to announce its presence to a client device 520 that is within BLE range. The BLE signal broadcasted may depend on the broadcast information in the data in the file capturing the attribute profile of remote BLE peripheral 510. Thus, accordingly, replicated BLE peripheral 503 broadcasts a BLE signal that is similar to the signal broadcasted by remote BLE peripheral 510. The client device 520 may be a computing device that has BLE capabilities (e.g., a personal computer, a mobile device, a smartphone, etc.) The client device 520 may receive the broadcast and request a BLE connection with replicated BLE peripheral 503. Upon acceptance of the request, a BLE network is established between client device 520 and replicated BLE peripheral 503. This is represented by the numeral 1. Client device 520 may use BLE protocols to discover the attribute profile replicated on replicated BLE peripheral 503. Client device 520 may then request an operation on a characteristic in the attribute profile. The operation may comprise a command (e.g. a WRITE command). This may be done in a similar manner as if client device 520 were interacting directly with BLE peripheral 510. Replicated BLE peripheral 503 may then interface with private API to relay the operation to BLE broker 512 via the intermediary network. BLE broker 512 may then relay the requested operation to access point 501 also via the intermediary network. Access point 501 may then issue a command that is associated with the operation to BLE peripheral 510 such that the operation is executed in BLE peripheral 510 via the BLE network between access point 501 and BLE peripheral 510. In some examples, replicated BLE peripheral may implement the functionalities as described with respect to computing device 600 and/or computing device 700.

Figure 6:
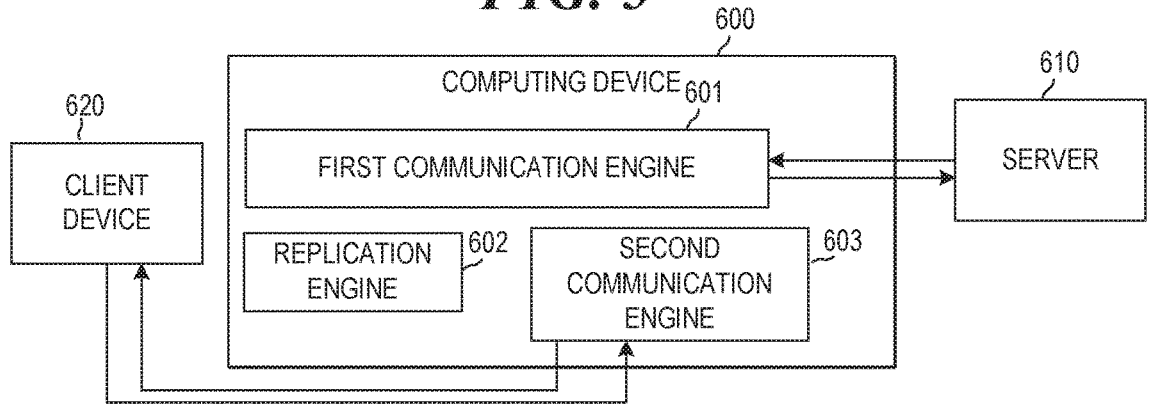
FIG. 6 is a block diagram of a computing device with a replication engine to replicate an attribute profile of a remote BLE device, according to some examples.

FIG. 6 illustrates a block diagram of a computing device 600 with a replication engine to replicate an attribute profile of a remote BLE low energy device (e.g., BLE peripheral 510). In some examples, computing device 600 is a mobile device (e.g., a smartphone, etc.), a personal computer, etc. that interacts with client device 620 and server 610. Computing device 600 comprises a first communication engine 601, a replication engine 602, and a second communication engine 603. Other engines may be added to computing device 600 for additional or alternative functionality.

Engines 601, 602, and 603 may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted on hardware (e.g., software that is stored in a memory and executed or interpreted by a processor), or by hardware and software hosted on hardware. Each engine of computing device 600 can include at least one machine-readable storage medium (for example, more than one) and at least one processing resource (for example, more than one).

For example, software that provides the functionality of engines on computing device 600 can be stored on a memory of a computer to be executed by a processing resource of the computer. In some examples, each engine of computing device 600 may include hardware in the form of a microprocessor on a single integrated circuit, related firmware, or other software for allowing the microprocessor to operatively communicate with other hardware of computing device 600.

First communication engine 601 is an engine of computing device 600 that includes a combination of hardware and software that allows computing device 600 to connect to another computing device (e.g., a server) through an intermediary network. The intermediary network is different from the BLE network that is relied upon by second communication engine 603 to connect to client device 620. Accordingly, the protocols used by first communication engine 601 may be different from the protocols used by second communication engine 603. For example, first communication engine 601 may use Internet protocols, such as TCP/IP, etc. while second communication engine 603 may rely on the BLE protocol. First communication engine 601 may also allow computing device 600 to receive data in the file that captures an attribute profile and may also transmit a requested operation initiated from client device 620 to server 610. As discussed above, server 610 may provide a private API. Accordingly, first communication engine 601 may allow computing device 600 to access the private API. Thus, computing device 600 is a computing device that is authorized to access the private API. Accordingly, first communication engine 601 may allow computing device 600 to offer credentials to server 610 in order to allow it access to the private API provided by server 610.

Replication engine 602 is an engine of computing device 600 that includes a combination of hardware and software that allows computing device 600 to generate an attribute profile that is a replication of a remote BLE device based on the data received by the first communication engine 601. As discussed above, the data is captured or transcribed into a file that is stored on server 610. The data is provided to computing device 600 via a private API on server 610. In some examples, the replicated attribute profile may comprise the same services and/or characteristics that was captured in the file. Accordingly, in some examples, the replicated attribute profile may comprise a GATT profile of the remote BLE device. In other examples, the replicated attribute profile may be a portion of the GATT profile of the remote BLE device.

Second communication engine 603 is an engine of computing device 600 that includes a combination of hardware and software that allows computing device 600 to connect to and communicate with the client device 620. In some examples, second communication engine 603 may allow computing device 600 to broadcast a BLE signal to announce its presence to client device 620, to accept a connection request sent by client device 620, and to allow client device 620 to discover the replicated attribute profile according to BLE protocols. Second communication engine 603 may also allow computing device 600 to receive a requested operation on a characteristic that originates from the client device 620.

In some examples, the remote BLE device may issue a response signal in response to a command that it receives from the remote access device that it is connected to. The response may be transmitted to server 610 and then related to computing device 600. Thus, in some examples, first communication engine 601 may allow computing device 600 to receive the response from the server 610. Additionally, second communication engine 603 may transmit the response to client device 620. Computing device 600 of FIG. 6, which is described in terms of engines containing hardware and software may include one or more structural or functional aspects of computing system 700 of FIG. 7, which is described in terms of processors and machine readable storage mediums.

Figure 7:
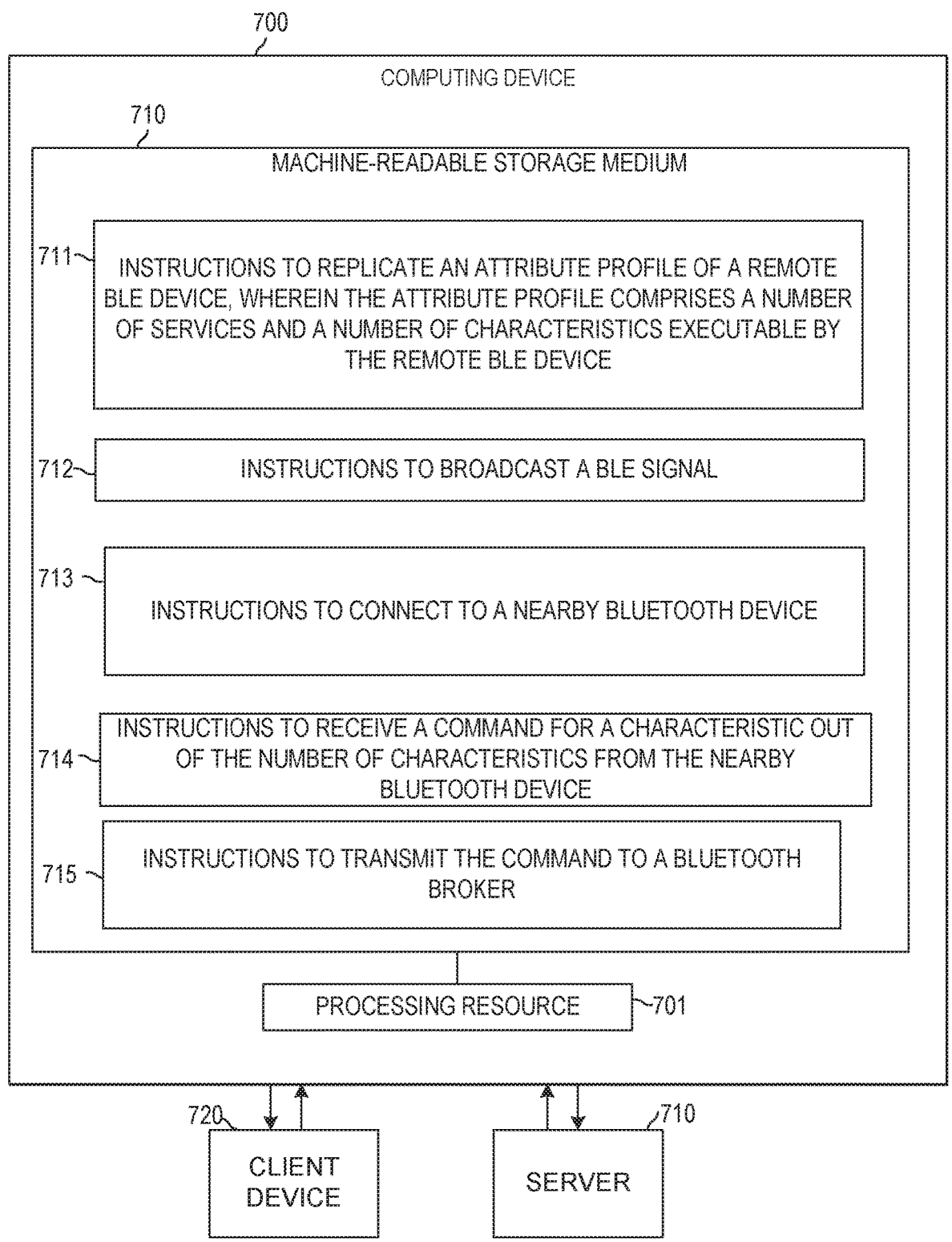
FIG. 7 is a block diagram of a computing device with instructions to replicate an attribute profile of a remote BLE device, according to some examples.

FIG. 7 is a block diagram of a computing device 700 with instructions thereon to replicate an attribute profile of a remote BLE device. In some examples, computing device 700 may be a mobile device, a personal computer, etc. that interfaces with server 721 and client device 720. Server 721 is similar to server 610 and/or server 502. Client device 720 may be similar to client device 620 and/or client device 520. Computing device 700 includes a processing resource 701 and a machine-readable storage medium 710. Machine-readable storage medium 710 may be in the form of non-transitory machine-readable storage medium, such as suitable electronic, magnetic, optical, or other physical storage apparatus to contain or store information such as instructions 711, 712, 713, 714, 715, related data, and the like.

In the example of FIG. 7, instructions 711, 712, 713, 714, and 715 are stored (e.g., encoded) on storage medium 710 and are executable by processing resource 701 to implement functionalities described herein in relation to FIG. 7. The processing resource 701 can be functional to fetch, decode, and execute instructions 711, 712, 713, 714, and 715 as described herein. In some examples, the functionalities of any of the instructions of storage medium 710 may be implemented in the form of electronic circuitry, in the form of executable instructions encoded on machine-readable storage medium, or a combination thereof.

Instructions 711 may be executable by processing resource 701 such that computing device 700 replicates an attribute profile of a remote BLE device. In some examples, the attribute profile may comprise a number of services and a number of characteristics executable by the remote BLE device. In some examples, the attribute profile may also comprise advertisement packets and scan response packets of the remote BLE device. These packets may allow computing device 700 to broadcast a signal that is similar to the signal that would be broadcasted by the remote BLE device. Remote BLE device, as described above, is also applicable here. In some examples, the replication of the attribute profile may be accomplished by receiving data from server 721 (that is from the file capturing the attribute profile). Instructions 711 may take this data and generate a data structure to describe the attribute profile. In some examples, the attribute profile may take the hierarchal format similar to that of a GATT profile. However, the replicated profile includes what is captured in the file, and may not include the entirety of the GATT profile on the remote BLE device. Accordingly, the attribute profile replicated by computing device 700 may comprise a number of services and a number of characteristics, where a number may include any number, including one, two, three, etc. These characteristics may represent functions that are executable by the remote BLE device. Additionally, in the example of FIG. 7, computing device 700 and server 721 are connected by an intermediary network. Accordingly, instructions 711 may also include instructions that are executable by processing resource 701 such that computing device 700 connects to and communicates with server 721. This may be implemented using protocols such as TCP/IP. As discussed above, server 721 may provide a private API. Accordingly, instructions 711 may include instructions executable by processing resource 701 that allows computing device 700 to offer credentials to server 721 in order to allow it access to the private API provided by server 721.

Instructions 712 may be executable by processing resource 701 such that computing device 700 broadcasts a BLE signal to announce its presence to nearby devices capable of BLE connection, like client device 720. As used herein, a "nearby" Bluetooth device in relation to a first computing device is a Bluetooth device that is within BLE range of the first computing device. Instructions 713 may be executable by processing resource 701 such that computing device 700 connects to a nearby Bluetooth device, such as client device 720. In some examples, this may include receiving a connection request from client device 720 and accepting the connection request. Similar to instructions 712, this may be done using BLE protocols. Once client device 720 and computing device 700 are connected via BLE, client device 720 and computing device 700 may engage in BLE protocols such that client device 720 discovers the attribute profile that is replicated by computing device 700. Accordingly, in some examples, instructions 712 may include instructions to respond to requests by client device 720 regarding discovery of the replicated attribute profile.

Instructions 714 may be executable by processing resource 701 such that computing device 700 receives a command for a characteristic out of the number of characteristics from the nearby Bluetooth device (e.g., client device 720). In other words, a requested operation may be issued by the user on client device 720 (e.g., turn off the lightbulb). The client device 720 may transmit this operation to computing device. The operation may include a command for the characteristic, for example a WRITE command associated with the characteristic. Instructions 714 allows computing device to receive this command.

Instructions 715 may be executable by processing resource 701 such that computing device 700 transmits the command to a Bluetooth broker. For example, server 721 may provide the Bluetooth broker. Because the connection between server 721 and computing device 700 is not via a BLE network but via an intermediary network, instructions 715 may use protocols used in the intermediary network which are different from protocols used in the BLE network.

In some examples, remote BLE device may issue a response signal in response to a command that it receives from the remote access device that it is connected to. The response may be transmitted to server 721 and then relayed to computing device 700. Thus, in some examples, machine-readable storage medium 710 may include instructions to receive the response to the command from server 721 and to transmit the response to the command to the client device 720.

Computing device 700 of FIG. 7, which is described in terms of processors and machine readable storage mediums, may include one or more structural or functional aspects of computing system 600 of FIG. 6, which are described in terms of engines containing hardware and software.

Figure 8:
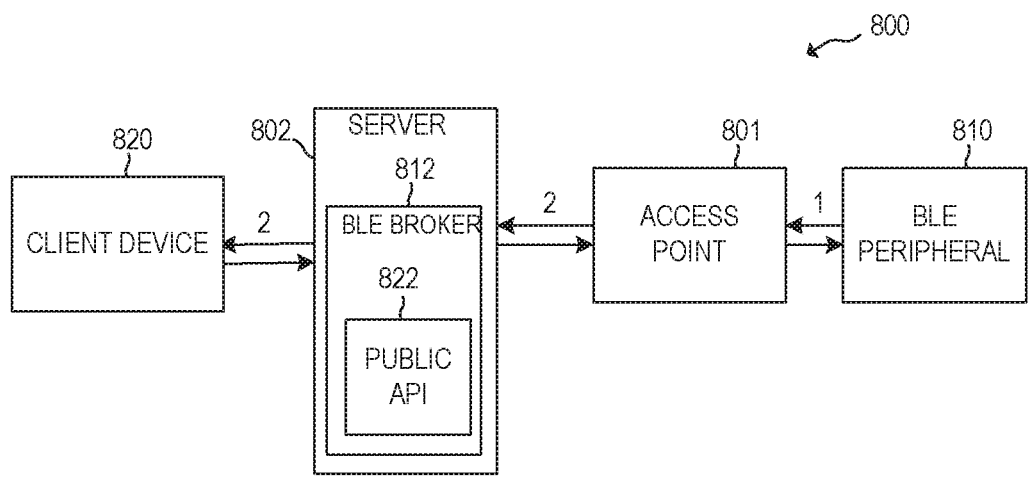
FIG. 8 is a block diagram of a BLE network using an intermediary network and a public API to extend the BLE network, according to some examples.

FIG. 8 is a block diagram of a network 800 that comprises a BLE network and an intermediary network. Network 800 comprises a BLE peripheral 810, access point 801, server 802, and client device 820. BLE peripheral 810 is similar to BLE peripheral 10, as discussed in relation to FIG. 1. The BLE network is between access point 801 and BLE peripheral 810, as represented by numeral 1. Access point 801, server 802, and client device 820 may be connected by an intermediary network. This is represented by numeral 2 linking access point 801 to server 802 and numeral 2 linking server 802 to client device 820. Access point 801 is similar to access point 101 as discussed in relation to FIG. 1.

Server 802 is similar to server 102 and BLE broker 812 is similar to BLE broker 112, as described in relation to FIG. 1, except that the service provided server 802 comprises a public API 822. As discussed above in relation to FIG. 3, a public API is an interface that is exposed to and accessible by wide range of users and computing devices. Using data in the file capturing the attribute profile of BLE peripheral 810, the public API may provide operations that are operable on the characteristics in the attribute (e.g., read operations, write operations, etc.). The public API may be accessed by a web application running on a computing device (e.g. a server). In some examples, the computing device running the web application is a different computing device than server 802. In other examples, it may be the same computing device as server 802. The web application may be specific for BLE peripheral 810. Client device 820 may be a computing device (e.g., a personal computer, a mobile device, a smartphone, etc.). Through the interface provided by the web application, client device 820 may issue operations to perform on BLE peripheral 810. The web application may then transmit these operations to BLE broker 812 via public API 822. BLE broker 812 may transmit the operation to access point 801, which may then issue a command to BLE peripheral 810 so that BLE peripheral 810 executes the operation.

Figure 9:
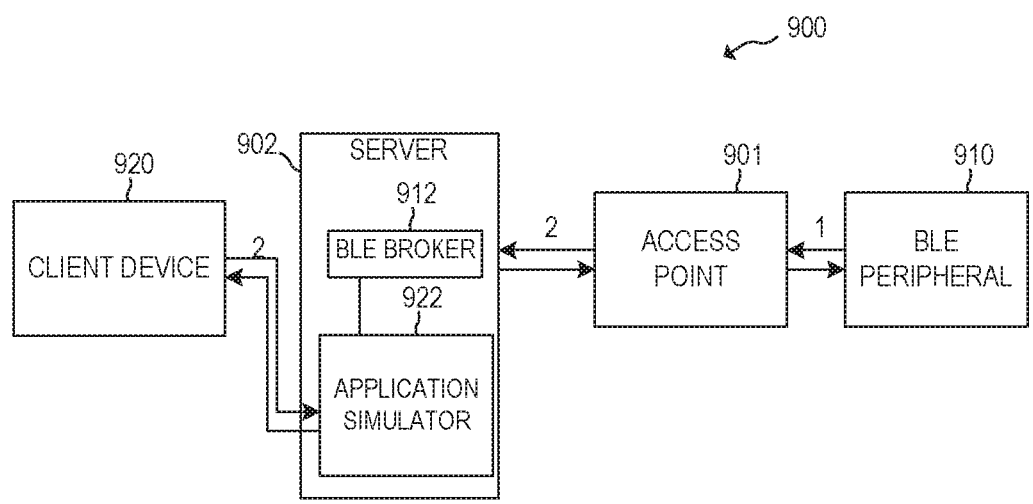
FIG. 9 is a block diagram of a BLE network using an intermediary network and an application simulator to extend the BLE network, according to some examples.

FIG. 9 is a block diagram of a network 900 that comprises a BLE network and an intermediary network. Network 900 comprises a BLE peripheral 910, access point 901, server 902, and client device 920. BLE peripheral 910 is similar to BLE peripheral 10, as discussed in relation to FIG. 1. The BLE network is between access point 901 and BLE peripheral 910, as represented by numeral 1. Access point 901, server 902, and client device 920 may be connected by an intermediary network. This is represented by numeral 2 linking access point 901 to server 902 and numeral 2 linking server 902 to client device 920. Access point 901 is similar to access point 101 as discussed in relation to FIG. 1.

Server 902 is similar to server 102 and BLE broker 912 is similar to BLE broker 122, as described in relation to FIG. 1, except that the service provided by server 902 comprises an application simulator 922. As discussed above in relation to FIG. 3, an application simulator may simulate a specific environment that allows application designed for the specific environment to run on environments differing from the specific environment. In some examples, the application simulator is a mobile application simulator. The simulator also will simulate a virtual machine that includes BLE connectivity ability. The client device 920 may access the mobile application simulator service, and run a mobile application that is specific to BLE peripheral 910. The mobile application may then invoke commands related to a characteristic on the attribute profile of BLE peripheral 910 initiated by client device 920. These commands may then be relayed to BLE broker 912 via application simulator 922. BLE broker 912 may transmit the operation to access point 901, which may then issue a command to BLE peripheral 910 so that BLE peripheral executes the operation.

Figure 10:
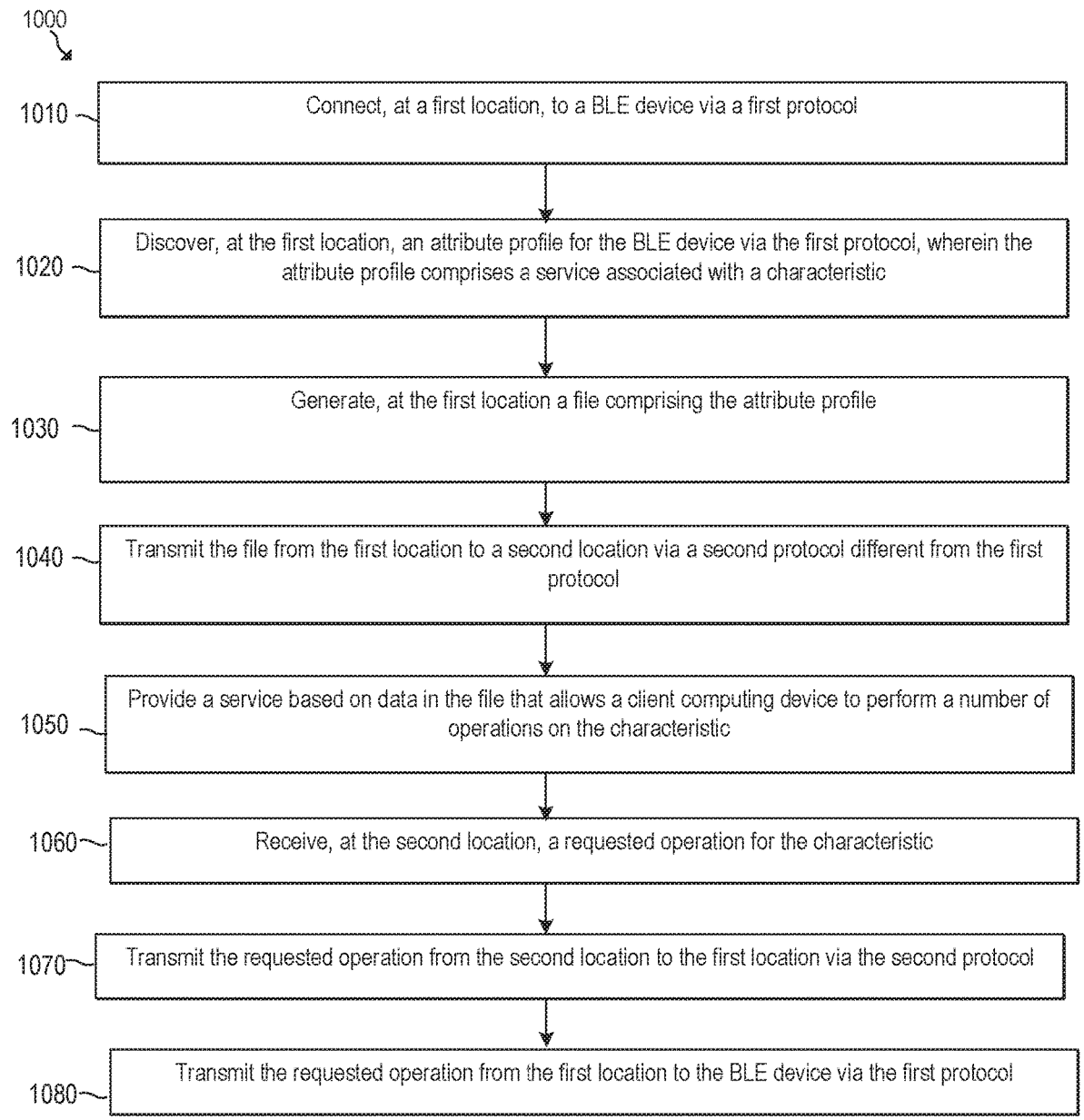
FIG. 10 is a flowchart of a method of extending a BLE network via an intermediary network, according to some examples.

FIG. 10 illustrates a flowchart for a method 1000 to a method of extending a BLE network with an intermediary network. Although execution of method 1000 is described below with reference to network 100, other suitable systems for execution of method 1000 may be utilized (e.g., network 500, network 800, or network 900). Additionally, implementation of method 1000 is not limited to such examples and it is appreciated that method 1000 may be used for any suitable device or system described herein or otherwise.

At 1010 of method 1000, access point 101 may connect to a BLE device (e.g., BLE peripheral 10) via a first protocol. In some examples, this protocol may be BLE protocol (including GATT and GAP). Access point 101 may be located at a first physical location. In some examples, this first physical location is within BLE range of the location of BLE peripheral 10. At 1020 of method 1000, access point 101 may discover an attribute profile of BLE peripheral 10. This may be done according to the first protocol. The attribute profile may comprise a service associated with a characteristic. Because this is done at access point 101, the discovery is done at the first location.

At 1030 of method 1000, access point 101 may generate a file that comprises the attribute profile discovered at 1020. In other words, the file may capture the attribute profile of BLE peripheral 10. In some examples, the file may be in a language-independent format, such as JSON. In some examples, the file may also be in a user-readable and machine-readable language such as XML. Because the file is generated by access point 101, the file is also generated at the same location as 1010 and 1020 are performed.

At 1040 of method 1000, access point 101 may transmit the file generated at 1030 to server 102. In some examples, server 102 may be located in a physical location that is remote from access point 101. In some examples, server 102 may also be located in a physical location that is remote from BLE peripheral 10. A computing device that is remote from BLE peripheral 10 is outside the BLE communication range of BLE peripheral 10. This location may be characterized as a second location. Additionally, access point 101 and server 102 may use an intermediary network to communicate and not a BLE network. Accordingly, the protocol used to transmit the file is a second protocol that is different from the first protocol. This may include protocols used in Internet communication, such as TCP/IP.

At 1050 of method 1000, server 102 may provide a service that allows a client computing device (e.g. client device not shown in FIG. 1) to perform a number of operations on the characteristic. In some examples, this may include BLE broker 112. Additionally, the service may also include a private API, a public API, and/or an application simulator, as discussed in relation to FIG. 3 and/or FIG. 4. In some examples, the access service and the BLE broker 112 may be provided at the same location. For example, in situations where a private API or a public API is provided, the APIs may be provided by server 102. In some examples, the BLE broker 112 and access service may be provided at different locations. For example, in situations where the access service is an application simulator, the application simulator may be hosted by a different computing device than server 102. This computing device may be located at a different location than server 102 and may communicate to server 102 through the intermediary network. In some examples, the service may be based on data in the file received at the second location in 1040. As used herein, the service is based on the data because the functions of the service are impacted by data in the file. For example, when the service includes a private API or a public API, the APIs may present operations to perform on the characteristics captured in the file. These operations may change based on the characteristics captured in the file. As another example, when the service includes an application simulator, application simulator may interact directly with the characteristics captured in the file. As discussed above, using these services allows a client device to perform a number of operations on the characteristic of the BLE peripheral 10.

Accordingly, this service is provided at a different location or different locations than the first location of the access point. This allows for easier access to the service than if the service were provided at the access point. A service that is provided at a single access point may require that the single access point be functional and accessible at all times. Additionally, while FIG. 10 describes a single service for a single BLE peripheral, multiple services related to multiple BLE peripherals may be provided by server 102. This allows a client device to interact with multiple BLE peripherals, allowing for easier scalability. For example, a client device may interact only with server 102 to interact with multiple access points (thus allowing client device to access many BLE peripherals). Additionally, a single access point may be tied to a specific physical location due to its interaction with the BLE peripheral.

At 1060, server 102 and specifically BLE broker 112 may receive a requested operation for the characteristic. This requested operation may be initiated by a client device. This is received by BLE broker 112 and is thus at the second location as described above. At 1070, server 102 transmits the requested operation to access point 101. This is from the second location, where server 102 is located, to the first location. Additionally, because access point 101 is connected to server 102 via an intermediary network and not BLE, the protocol that is used in communication is the second protocol and not the first protocol.

Although the flowchart of FIG. 10 shows a specific order of performance of certain functionalities, method 1000 is not limited to that order. For example, some of the functionalities shown in succession may be performed in a different order, may be executed concurrently or with partial concurrence, or a combination thereof. For example, 1050 and 1060 may be performed concurrently. In some examples, functionalities described herein in relation to FIG. 10 may be provided in combination with functionalities described herein in relation to any of FIGS. 1-9. Additionally, while FIG. 10 discusses a specific amount of attribute profiles, services, and characteristics, method 10 is not limited to the number of attribute profiles, services, and characteristics described. For example, two, three, etc. attribute profiles may be discovered for two, three, etc. BLE devices.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:
1. A method comprising:
connecting, at a remote access device located at a first location, to a Bluetooth low energy device over a Bluetooth low energy network via a first protocol, the first protocol being a Bluetooth low energy communication protocol;
discovering, at the remote access device, an attribute profile for the Bluetooth low energy device via the Bluetooth low energy network, wherein the attribute profile comprises one or more services including a first service associated with a first characteristic for the Bluetooth low energy device;
generating, at the remote access device, a file comprising the attribute profile;
transmitting the file from the remote access device to a server at a second location via a second protocol different from the first protocol;
replicating the attribute profile of the Bluetooth low energy device at a computing device located at a third location;
broadcasting a Bluetooth low energy signal from the computing device;

connecting, at the computing device, to a client computing device over a second Bluetooth low energy network;

receiving, at the computing device, a first requested operation from the client computing device via the second Bluetooth low energy network;

transmitting the first requested operation from the computing device to the server;

providing, at the server, an access service based on data in the file to enable the client computing device to perform a number of operations including the first requested operation on the first characteristic, wherein the client computing device is not within Bluetooth low energy communication range of the Bluetooth low energy device;

receiving, at the server from the client computing device, the first requested operation for the first characteristic;

transmitting the first requested operation from the server to the remote access device via the second protocol; and transmitting the first requested operation via the Bluetooth low energy network using the first protocol from the remote access device to the Bluetooth low energy device.

2. The method of claim 1, wherein the Bluetooth low energy device is within Bluetooth low energy communication range of the first location.

3. The method of claim 1, further comprising:
storing the file at the server in an attribute database that associates the file to the Bluetooth low energy device.

4. The method of claim 1, wherein the access service comprises a public application program interface.

5. The method of claim 1, wherein the access service comprises a private application program interface.

6. The method of claim 5, wherein the private application program interface is accessible by an authenticated computing device.

7. The method claim 1, wherein the access service comprises an application simulator.

8. A non-transitory machine-readable storage medium comprising instructions, that, when executed, cause a processing resource to:

connecting, at a remote access device located at a first location, to a Bluetooth low energy device over a Bluetooth low energy network via a first protocol, the first protocol being a Bluetooth low energy communication protocol;

discovering, at the remote access device, an attribute profile for the Bluetooth low energy device via the Bluetooth low energy network, wherein the attribute profile comprises one or more services including a first service associated with a first characteristic for the Bluetooth low energy device;

generating, at the remote access device, a file comprising the attribute profile;

transmitting the file from the remote access device to a server at a second location via a second protocol different from the first protocol;

replicating the attribute profile of the Bluetooth low energy device at a computing device located at a third location;

broadcasting a Bluetooth low energy signal from the computing device;

connecting, at the computing device, to a client computing device over a second Bluetooth low energy network;

receiving, at the computing device, a first requested operation from the client computing device via the second Bluetooth low energy network;

transmitting the first requested operation from the computing device to the server;

providing, at the server, an access service based on data in the file to enable the client computing device to perform a number of operations including the first requested operation on the first characteristic, wherein the client computing device is not within Bluetooth low energy communication range of the Bluetooth low energy device;

receiving, at the server from the client computing device, the first requested operation for the first characteristic;

transmitting the first requested operation from the server to the remote access device via the second protocol; and transmitting the first requested operation via the Bluetooth low energy network using the first protocol from the remote access device to the Bluetooth low energy device.

9. The storage medium of claim 8, wherein the Bluetooth low energy device is within Bluetooth low energy communication range of the first location.

10. The storage medium of claim 8, further comprising instructions, that, when executed, cause the processing resource to:

storing the file at the server in an attribute database that associates the file to the Bluetooth low energy device.

11. The storage medium of claim 8, wherein the access service comprises a public application program interface.

12. The storage medium of claim 8, wherein the access service comprises a private application program interface.

13. The storage medium of claim 12, wherein the private application program interface is accessible by an authenticated computing device.

14. The storage medium of claim 8, wherein the access service comprises an application simulator.

15. A system comprising:
a remote access device located at a first location;
a server at a second location; and
a computing device located at a third location, wherein the system is to:
connect, at the remote access device, to a Bluetooth low energy device over a Bluetooth low energy network via a first protocol, the first protocol being a Bluetooth low energy communication protocol, discover, at the remote access device, an attribute profile for the Bluetooth low energy device via the Bluetooth low energy network, wherein the attribute profile comprises one or more services including a first service associated with a first characteristic for the Bluetooth low energy device, generate, at the remote access device, a file comprising the attribute profile, transmit the file from the remote access device to the server via a second protocol different from the first protocol, replicate the attribute profile of the Bluetooth low energy device at the computing device, broadcast a Bluetooth low energy signal from the computing device, connect, at the computing device, to a client computing device over a second Bluetooth low energy network, receiving, at the computing device, a first requested operation from the client computing device via the second Bluetooth low energy network, transmitting the first requested operation from the computing device to the server, provide, at the server, an access service based on data in the file to enable the client computing device to perform a number of operations on the first characteristic, wherein the client computing device is not within Bluetooth low energy communication range of the Bluetooth low energy device, receive, at the server from the client computing device, the first requested operation for the first characteristic, transmit the first requested operation from the server to the remote access device via the second protocol, and transmit the first requested operation via the Bluetooth low energy network using the first protocol from the remote access device to the Bluetooth low energy device.

16. The system of claim 15, wherein the Bluetooth low energy device is within Bluetooth low energy communication range of the first location.

17. The system of claim 15, wherein the system is further to:

store the file at the server in an attribute database that associates the file to the Bluetooth low energy device.

18. The system of claim 15, wherein the access service comprises a public application program interface.

19. The system of claim 15, wherein the access service comprises a private application program interface.

20. The system of claim 19, wherein the private application program interface is accessible by an authenticated computing device.

21. The system of claim 15, wherein the access service comprises an application simulator.

* * * * *